(12) United States Patent
Mori et al.

(10) Patent No.: US 10,005,391 B2
(45) Date of Patent: Jun. 26, 2018

(54) INFORMATION PRESENTATION SYSTEM

(71) Applicant: TOYOTA JIDOSHA KABUSHIKI KAISHA, Toyota-shi, Aichi (JP)

(72) Inventors: Hiroki Mori, Susono (JP); Ryuji Funayama, Yokohama (JP); Jun Sato, Susono (JP); Ayako Shimizu, Numazu (JP); Yuichi Kumai, Gotenba (JP); Yuma Kawamori, Susono (JP); Takeshi Matsumura, Numazu (JP); Tsukasa Shimizu, Nagakute (JP); Yasuo Sakaguchi, Nagakute (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days. days.

(21) Appl. No.: 15/809,314

(22) Filed: Nov. 10, 2017

(65) Prior Publication Data

US 2018/0065552 A1   Mar. 8, 2018

Related U.S. Application Data

(63) Continuation of application No. 15/193,192, filed on Jun. 27, 2016, now Pat. No. 9,849,832.

(30) Foreign Application Priority Data

Jul. 21, 2015   (JP) .................................. 2015-144110

(51) Int. Cl.
*B60Q 1/00* (2006.01)
*B60Q 9/00* (2006.01)
*B60R 1/00* (2006.01)

(52) U.S. Cl.
CPC .................. *B60Q 9/00* (2013.01); *B60R 1/00* (2013.01); *B60R 2300/302* (2013.01); *B60R 2300/305* (2013.01)

(58) Field of Classification Search
CPC ....... B60Q 9/00; B60R 1/00; B60R 2300/302; B60R 2300/305
See application file for complete search history.

(56) References Cited

U.S. PATENT DOCUMENTS

| 2014/0249722 A1 | 9/2014 | Hegemann et al. |
| 2015/0015596 A1 | 1/2015 | Nagatomi et al. |
| 2016/0368417 A1 | 12/2016 | Bassi et al. |

FOREIGN PATENT DOCUMENTS

| JP | 2005-78414 A | 3/2005 |
| JP | 2015-11666 A | 1/2015 |
| JP | 2015-18438 A | 1/2015 |

*Primary Examiner* — Omeed Alizada
(74) *Attorney, Agent, or Firm* — Sughrue Mion, PLLC

(57) ABSTRACT

A system for presenting information to an occupant of a vehicle mounted with an autonomous driving system, includes: a display unit configured to display the information; a display control unit configured to cause the display unit to display information in any one of display modes among a setting status display mode in which setting information is displayed, an operation status display mode in which travel information is displayed, and a recognition status display mode in which recognition result information of the autonomous driving system is displayed; and an acquisition unit configured to acquire an occupant's display mode switching instruction for switching the display mode, wherein the display control unit configured to switch the display mode of the display unit when the acquisition unit acquires the occupant's display mode switching instruction.

16 Claims, 8 Drawing Sheets

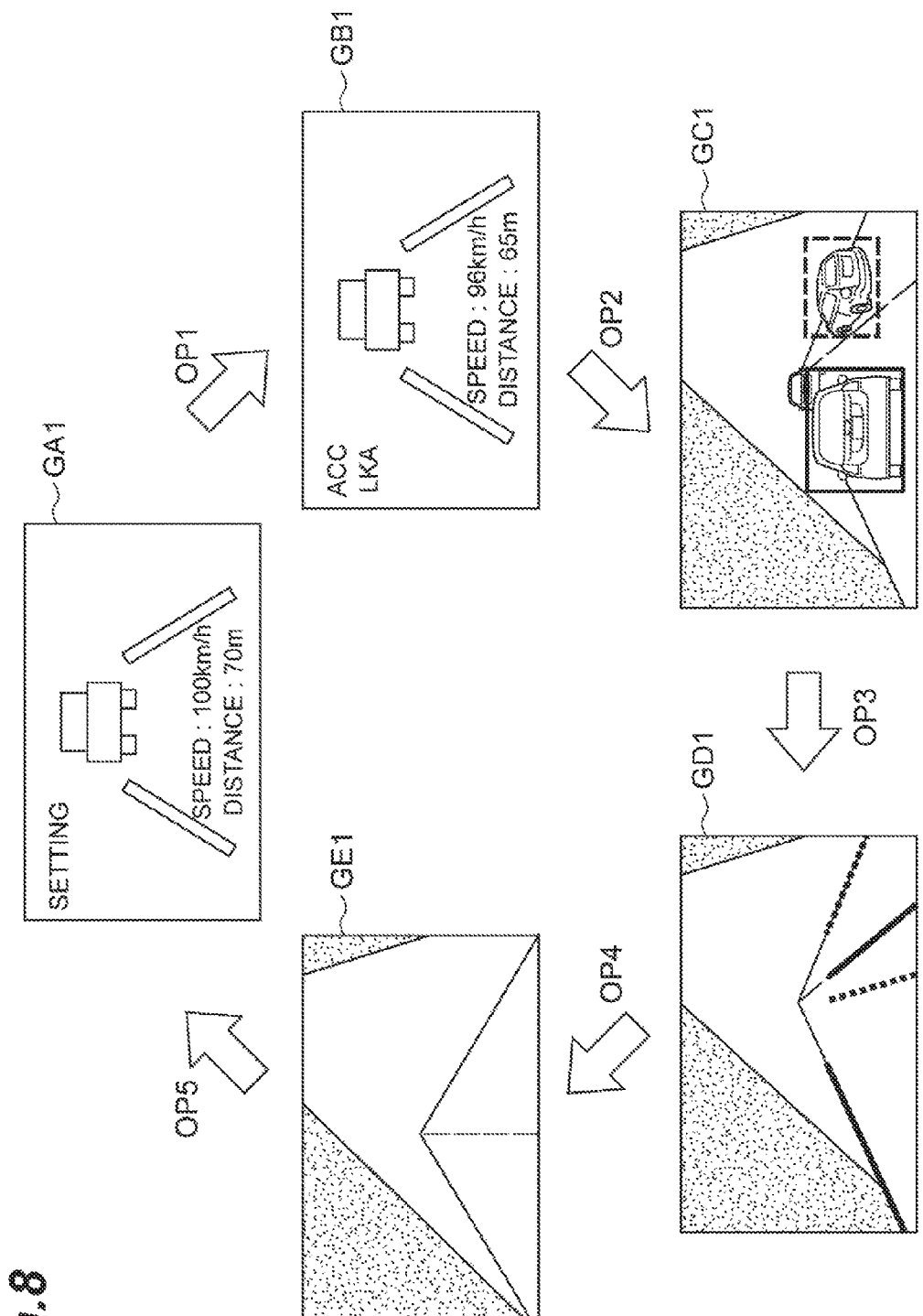

INFORMATION PRESENTATION SYSTEM

CROSS-REFERENCE TO RELATED APPLICATION

This application is a Continuation Application of U.S. application Ser. No. 15/193,192 filed Jun. 27, 2016, which is based on Japanese Patent Application No. 2015-144110 filed with Japan Patent Office on Jul. 21, 2015, the entire contents of which are hereby incorporated by reference.

TECHNICAL FIELD

The present disclosure relates to an information presentation system.

BACKGROUND

In Japanese Unexamined Patent Publication No. 2015-18438, an information presentation system is disclosed, which acquires image data for surroundings of a vehicle using a camera during autonomous driving and displays the image data on a display device. In this system, in a case where the vehicle recognizes a preset target object in the acquired image data, by performing filter processing such as blurring on the image data of the recognized target object, a visibility for the image data of the target object recognized by the vehicle deteriorates. In this way, it is possible to cause a driver to pay attention to a part which has not been recognized by the vehicle.

SUMMARY

The system disclosed in Japanese Unexamined Patent Publication No. 2015-18438 only presents the information recognized by the vehicle to the driver. Therefore, occupants of the vehicle cannot determine what kind of autonomous driving system is operating and how it is operating based on the information recognized by the vehicle. In this technical field, it is desirable to provide an information presentation system that can present the information recognized by an autonomous driving system to the occupants in association with setting information in the autonomous driving system and travel information of the vehicle based on an occupant's instruction.

An information presentation system in an aspect of the present invention is configured to present information to an occupant of a vehicle on which an autonomous driving system is mounted. The information presentation system includes: a display unit configured to display the information; a display control unit configured to cause the display unit to display information in any one of display modes among a setting status display mode in which setting information for an autonomous driving set by the occupant or the autonomous driving system is displayed, an operation status display mode in which travel information at the time when the autonomous driving system is operating is displayed, and a recognition status display mode in which recognition result information of the autonomous driving system is displayed; and an acquisition unit configured to acquire an occupant's display mode switching instruction for switching the display mode of the display unit. In a case where the occupant's display mode switching instruction is acquired by the acquisition unit, the display control unit is configured to switch the display mode of the display unit based on the occupant's display mode switching instruction.

In this information presentation system, the display control unit causes the display unit to perform displaying any one of the displaying modes among the setting status display mode, the operation status display mode, and the recognition status display mode. In a case where the occupant's display mode switching instruction is acquired by the acquisition unit, the display control unit causes the display mode of the display unit to be switched based on the occupant's display mode switching instruction. Therefore, this information presentation system can present the recognition information of the autonomous driving system to the occupant in association with the setting information in the autonomous driving system and the travel information of the vehicle based on the occupant's instruction.

In an embodiment, in a case where the display unit is caused to display the information in the recognition status display mode, the display control unit may be configured to cause the display unit to display a travel lane of the vehicle recognized by the autonomous driving system and a certainty level of recognizing the travel lane. In this case, this information presentation system can present the travel lane of the vehicle recognized by the autonomous driving system and the certainty level of recognizing the travel lane to the occupant in association with the setting information in the autonomous driving system and the travel information of the vehicle based on the occupant's instruction.

According to an aspect and an embodiment of the present invention, it is possible to present the recognition information of the autonomous driving system to the occupant in association with the setting information in the autonomous driving system and the travel information of the vehicle based on the occupant's instruction.

BRIEF DESCRIPTION OF THE DRAWINGS

FIG. 8 is a conceptual diagram describing the display mode switching processing.

DETAILED DESCRIPTION

Hereinafter, an embodiment of the present invention will be described with reference to the drawings. Note that in the following description, same or equivalent elements are denoted by the same reference signs and redundant description thereof will be omitted.

Figure 1:
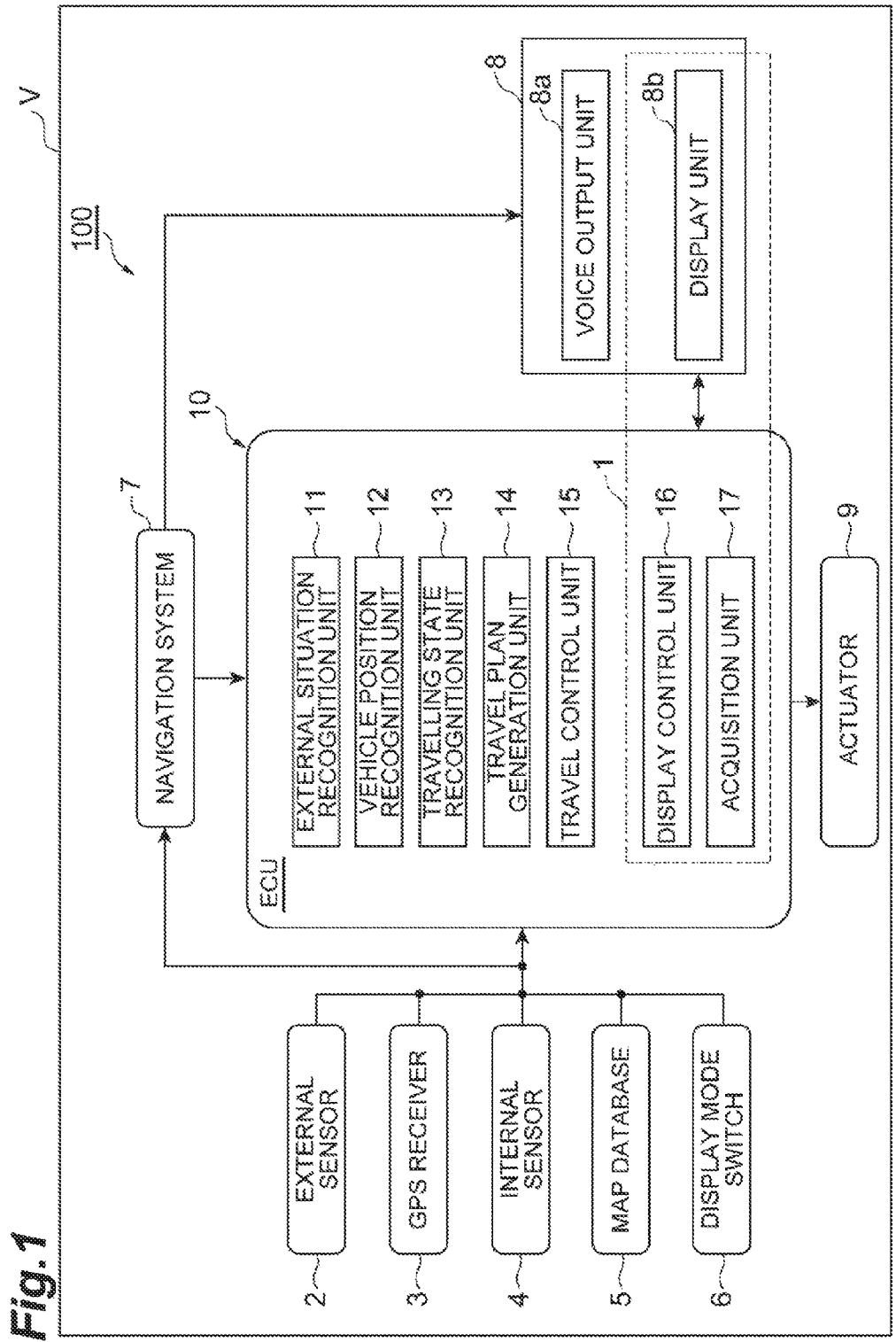
FIG. 1 is a block diagram illustrating a configuration of a vehicle that includes an information presentation system in the present embodiment.

FIG. 1 is a block diagram illustrating a configuration of a vehicle that includes an information presentation system in the embodiment. As illustrated in FIG. 1, an autonomous driving system 100 is mounted on a vehicle V such as a passenger car. The autonomous driving system 100 is a system that performs, for example, a travel control (steering control) to cause the vehicle V to travel in a lane center of a travel lane by an autonomous driving, and a travel control (speed control) to cause the vehicle V to travel following a preceding vehicle by the autonomous driving based on a set vehicle speed and a set vehicle-to-vehicle distance. As an example, the autonomous driving system 100 includes an information presentation system 1. The information presentation system 1 presents information to occupants of the vehicle V on which the autonomous driving system 100 is mounted. The occupants are persons in the vehicle V, for example, a driver. Hereinafter, a case where the occupant is a driver will be described as an example.

The autonomous driving system 100 includes an external sensor 2, a Global Positioning System (GPS) receiver 3, an internal sensor 4, a map database 5, a display mode switch 6, a navigation system 7, a Human Machine Interface (HMI) 8, an actuator 9, and an Electronic Control Unit (ECU) 10.

The external sensor 2 detects an external situation which is surroundings information of the vehicle V. The external sensor 2 includes, for example, at least one of a camera, radar, and a Laser Imaging Detection And Ranging (LIDAR).

The camera is an imaging device that images the external situation of the vehicle V. The camera is, for example, provided on the inside of windshield of the vehicle. The camera may be a monocular camera or may be a stereo camera. The stereo camera has, for example, two imaging units that are arranged so as to reproduce a binocular parallax. The image information from the stereo camera includes information of the depth direction. The image information relating to the external situation of the vehicle V is output to the ECU 10.

The radar is a detection device that detects an object outside of the vehicle V using a radio wave. The radio wave is, for example, a millimeter wave. The radar detects the object by transmitting the radio wave to the surroundings of the vehicle V and receiving the radio wave reflected from the object. The radar can output, for example, the presence or absence of an object, a distance to the object, a relative speed (a speed difference between the vehicle V and a preceding vehicle) of the object to the vehicle V or a direction as object information. The radar outputs the detected object information to the ECU 10.

The LIDAR is a detection device that detects an object outside of the vehicle V using light. The LIDAR transmits the light to the surroundings of the vehicle V, measures the distance to the reflection point by receiving the light reflected from the object, and then, detects the object. The LIDAR can output, for example, the presence or absence of the object, the distance to the object, the relative speed (the speed difference between the vehicle V and a preceding vehicle) of the object to the vehicle V or the direction as the object information. The LIDAR outputs the detected object information to the ECU 10. The camera, the LIDAR, and the radar are not necessarily prepared in an overlapping manner.

The GPS receiver 3 receives signals from three or more GPS satellites and acquires position information indicating a position of the vehicle V. For example, the latitude and longitude are included in the position information. The GPS receiver 3 outputs the measured position information of the vehicle V to the ECU 10. Instead of the GPS receiver 3, another means for specifying the latitude and the longitude at which the vehicle V is present may be used.

The internal sensor 4 detects information according to the travelling state of a vehicle V. The internal sensor 4 includes at least one of a speed sensor, an acceleration sensor, and a yaw rate sensor in order to detect the information according to the travelling state of a vehicle V.

The speed sensor is a detection device that detects a speed of the vehicle V. As the speed sensor, for example, a wheel speed sensor is used, which is provided on vehicle wheels of the vehicle V or a drive shaft rotating integrally with the vehicle wheels and detects a rotational speed of the vehicle wheels. The speed sensor outputs the detected speed information (wheel speed information) including the speed of the vehicle V to the ECU 10.

The acceleration sensor is a detection device that detects an acceleration of the vehicle V. The acceleration sensor includes, for example, a longitudinal acceleration sensor that detects acceleration in the longitudinal direction of the vehicle V and a lateral acceleration sensor that detects a lateral acceleration of the vehicle V. The acceleration sensor outputs, for example, the detected acceleration information including the acceleration of the vehicle V to the ECU 10.

The yaw rate sensor is a detection device that detects a yaw rate (rotational angular velocity) around the vertical axis of the center of gravity of the vehicle V. As the yaw rate sensor, for example, a gyro sensor can be used. The yaw rate sensor outputs the detected yaw rate information including the yaw rate of the vehicle V to the ECU 10.

The map database 5 is a database in which map information is included. The map database 5 is formed, for example, in a hard disk drive (HDD) mounted on the vehicle V. In the map information, for example, position information of roads, information on road types, and position information of intersections and branch points are included. In the information on road types includes, for example, types of straight portion and a curved portion, and a curvature of the curve are included. The map database 5 may be stored in a computer in the facility such as an information processing center which is capable of communicating with the vehicle V.

The display mode switch 6 is an input device operated by the driver of the vehicle V. The display mode switch 6 outputs a signal indicating a display mode switching instruction for switching the display mode on a display unit 8b described below according to the display mode switching operation by the driver of the vehicle V to the ECU 10. The display mode switch 6 may be configured as hardware or may be configured to be combined with software by a touch panel. Alternatively, the autonomous driving system 100 may include a gesture recognition device, a voice recognition device, or the like instead of the display mode switch 6. In this case, the gesture recognition device or a voice recognition device may output the display mode switching instruction for switching the display mode on the display unit 8b to the ECU 10 based on the recognition result.

The navigation system 7 is a device that performs guidance to a destination set on the map by a driver of the vehicle V for the driver of the vehicle V. The navigation system 7 calculates a travelling route of the vehicle V based on the position information of the vehicle V measured by the GPS receiver 3 and the map information in the map database 5. The route may be a route on which, for example, a travelling lane in which the vehicle V travels is specified in the road section of multi-lane. The navigation system 7 calculates, for example, a target route from the position of the vehicle V to the destination and performs notification on the driver of the target route using the HMI 8 described below. In addition, the navigation system 7, for example, outputs the target route information of the vehicle V to the ECU 10. The navigation system 7 may use the information stored in the computer in the facility such as an information processing center which is capable of communicating with the vehicle V. In addition, a part of the processing performed by the navigation system 7 may be performed by the computer in the facility.

The HMI 8 is an interface that performs an input and output of the information between the driver of the vehicle V and the autonomous driving system 100. The HMI 8 includes, for example, a voice output unit 8a and the display unit 8b as the output interface. The voice output unit 8a is a device that outputs a voice, for example, a speaker or the like. The voice output unit 8a presents information to the driver through the hearing. The display unit 8b is a device mounted, for example, on the vehicle V, and displays information such as a character, a diagram, an image or a video image. A navigation screen display device that is connected to the navigation system 7, a display provided on an instrument panel, or a head up display (HUD) that projects information on a windshield can be used as the display unit 8b. The display unit 8b can display various information based on a control signal from the ECU 10. For example, the display unit 8b displays, for example, the information in a plurality of display modes based on the control signal from the ECU 10. The plurality of display modes will be described below.

The HMI 8 includes, for example, an operation button or a touch panel for performing the input operation of the driver as the input interface. For example, the HMI 8 includes an autonomous driving ON/OFF switch that is an input unit for inputting an operation for requesting the starting of the autonomous driving. The autonomous driving ON/OFF switch may be configured to enable the driver to input the operation for requesting the ending of the autonomous driving. When the driver performs an operation for requesting for the start or end of the autonomous driving, the autonomous driving ON/OFF switch outputs information indicating the starting or ending of the autonomous driving to the ECU 10. In addition, the HMI 8 may be configured to be capable of setting the target speed, target vehicle-to-vehicle distance, or the like of the vehicle V at the time of autonomous driving. The HMI 8 is not limited to the switch, but may be any device as long as the device can input information with which the driver's intention can be determined. For example, the HMI 8 may be an autonomous driving start button, an autonomous driving end button, or the like, or may be an object of a switch or a button displayed on a screen which can be operated by the driver. The HMI 8 may perform the outputting of the information to the driver using a wirelessly connected mobile information terminal or may receive input operation of the driver using the mobile information terminal.

The actuator 9 is a device that executes the travel control of the vehicle V. The actuator 9 includes, for example, at least a throttle actuator, a brake actuator, and a steering actuator. The throttle actuator controls a supply amount (throttle opening degree) of air to an engine according to the control signal from the ECU 10, and controls the driving power of the vehicle V. In a case where the vehicle V is a hybrid vehicle or an electric vehicle, the driving power is controlled by the control signal from the ECU 10 being input to a motor which is a source of the driving force.

The brake actuator controls a brake system according to the control signal from the ECU 10 and controls the braking power given to the wheels of the vehicle V. For example, a hydraulic brake system can be used as the brake system. The steering actuator controls the driving of an assist motor that controls steering torque in the electric power steering system according to the control signal from the ECU 10. In this way, the steering actuator controls the steering torque of the vehicle V.

The ECU 10 controls the vehicle V. The ECU 10 is an electronic control unit including a central processing unit (CPU), a read only memory (ROM), a random access memory (RAM), a controller area network (CAN) communication circuit, or the like. The ECU 10 is, for example, connected to a network that communicates using the CAN communication circuit so as to be capable of communicating with the configuration elements of the vehicle V described above. The ECU 10 inputs and outputs the data by causing the CAN communication circuit to operate, stores the input data in the RAM, loads a program stored in the ROM on the RAM, and executes the program loaded on the RAM based on, for example, the signal output from the CPU, and then, realizes each functions of the configuration elements of the ECU 10 as described below. The ECU 10 may be configured of a plurality of electronic control units.

The ECU 10 includes a external situation recognition unit 11, a vehicle position recognition unit 12, a travelling state recognition unit 13, a travel plan generation unit 14, a travel control unit 15, a display control unit 16 and an acquisition unit 17.

The external situation recognition unit 11 acquires the surroundings information of the vehicle V. The surroundings information means information indicating an environment or a situation of the vehicle V within a predetermined range. For example, the external situation recognition unit 11 acquires the detection result of the external sensor 2 as the surroundings information of the vehicle V. For example, the image information from the camera, the object information from the radar, the object information from the LIDAR, or the like are included in the detection result of the external sensor 2. The external situation recognition unit 11 stores the object information (value of the sensor) including the distance to the object (vehicle-to-vehicle distance) in the storage unit included in the ECU 10. As described below, the distance to the object (vehicle-to-vehicle distance) can be displayed on the display unit 8b as travel information when the autonomous driving system 100 is in operation.

The external situation recognition unit 11 recognizes the external situation of the vehicle V based on the acquired information. The external situation of the vehicle V may include, for example, the number of lanes on the travelling road, a lane boundary line, a center line, a branch, a merging point, a traffic regulation, a position of the center of the lane, a width of the road, and a type of the road. The type of the road may be, for example, a curvature of the travelling lane, a gradient change of the road effective for estimating the prospects of the external sensor 2, and an undulation. Furthermore, the external situation recognition unit 11 may recognize a presence or absence, and a position of another vehicle based on the object information. The external situation recognition unit 11 stores the external situation including, for example, the number of lanes on the travelling road, the position the lane boundary line, the position of the center line, the presence or absence, and the position of another vehicle in the storage unit included in the ECU 10. As described below, the external situation of the vehicle V can be displayed on the display unit 8b as recognition result information when the autonomous driving system 100 is in operation.

When recognizing the external situation of the vehicle V, the external situation recognition unit 11 may calculates a certainty level of the recognition in association with the recognition result. The certainty level of the recognition is a degree indicating a certainty of the recognition. For example, the external situation recognition unit 11 calculates the certainty level of the recognition in association with the recognition result according to reliability of the data used for recognizing the external situation of the vehicle V, the number of the data items, and the performance of the sensors. A known method can be used as a method for calculating such a certainty level of the recognition. The external situation recognition unit 11 stores the certainty level of the recognition in association with the recognition result including, for example, the number of lanes on the travelling road, positions of the lane boundary lines, and a position of the center line in the storage unit included in the ECU 10.

The vehicle position recognition unit 12 recognizes the vehicle position of the vehicle V on the map based on the vehicle position information of the vehicle V received by the GPS receiver 3 and the map information in the map database 5. The vehicle position recognition unit 12 may recognize the vehicle position by acquiring the vehicle position used in the navigation system 7 from the navigation system 7. In a case where the vehicle position of the vehicle is measured by a sensor installed at the outside of the vehicle such as the road, the vehicle position recognition unit 12 may acquire the vehicle position from the sensor by a communication. The vehicle position recognition unit 12 stores the recognition result including, for example, the vehicle position of the vehicle V in the storage unit included in the ECU 10. The vehicle position of the vehicle V can be displayed on the display unit 8b as recognition result information at the time when the autonomous driving system 100 is in operation.

The vehicle position recognition unit 12 may recognize (estimates) a travel lane based on the recognized vehicle position and the map information in the map database 5 or the recognition result from the external situation recognition unit 11. The vehicle position recognition unit 12 determines whether or not the vehicle V travels on a road having a plurality of lanes in a same travelling direction (road of multiple lanes in one way). Then, in a case where it is determined that the vehicle V travels on the road of multiple lanes in one way, the vehicle position recognition unit 12 may recognize the travel lane of the vehicle V among the plurality of lanes based on, for example, the vehicle position of the vehicle V and the map information. The vehicle position recognition unit 12 may recognize the travel lane of the vehicle V based on the recognition result (the result of imaging the travelling road by the camera) from the external situation recognition unit 11. The vehicle position recognition unit 12 stores, for example, the result of recognizing the travel lane of the vehicle V in the storage unit included in the ECU 10. As described below, the travel lane of the vehicle V can be displayed on the display unit 8b as the recognition result information at the time when the autonomous driving system 100 is in operation.

In addition, the vehicle position recognition unit 12 may recognize a lateral position of the vehicle V in the travel lane based on the vehicle position recognized by the vehicle position recognition unit 12 and the map information in the map database 5. The vehicle position recognition unit 12 stores, for example, the lateral position of the vehicle V in the storage unit included in the ECU 10. The lateral position of the vehicle V can be displayed on the display unit 8b as the recognition result information at the time when the autonomous driving system 100 is in operation.

When recognizing the travel lane of the vehicle V or the lateral position of the vehicle V, the vehicle position recognition unit 12 may calculate the certainty level of the recognition in association with the recognition result. For example, the vehicle position recognition unit 12 calculates the certainty level of the recognition in association with the recognition result according to the reliability of the data used for recognizing the travel lane of the vehicle V or the lateral position of the vehicle V, the number of the data items, and the performance of the sensors. A known method can be used as a method for calculating such the certainty level of the recognition. The vehicle position recognition unit 12 stores, for example, the certainty level of the recognition in association with the result of recognizing the travel lane of the vehicle V or the lateral position of the vehicle V in the storage unit included in the ECU 10.

The travelling state recognition unit 13 recognizes a travelling state of the vehicle V based on the detection result of the internal sensor 4. The travelling state is a behavior of the vehicle V and is a value detected by, for example, the internal sensor 4. The travel information may include only one kind of value (for example, a speed) or may include a multiple kinds of values (for example, the speed and the acceleration). In the result of detection by the internal sensor 4, for example, the speed information from the speed sensor, the acceleration information from the acceleration sensor, the yaw rate information from the yaw rate sensor and the like are included. The travelling state recognition unit 13 stores, for example, the travelling state (value of the sensors) including the speed of the vehicle V in the storage unit included in the ECU 10. As described below, the speed of the vehicle V can be displayed on the display unit 8b as the travel information at the time when the autonomous driving system 100 is in operation.

The travel plan generation unit 14 generates a travel path of the vehicle V based on the target route calculated by the navigation system 7, the vehicle position recognized by the vehicle position recognition unit 12, and the external situation (including the vehicle position and the direction) of the vehicle V recognized by the external situation recognition unit 11. The travel path is a trajectory on which the vehicle V progresses on the target route. The travel plan generation unit 14 generates the travel path on the target route such that the vehicle V travels while satisfying the references such as the safety, regulatory compliance, and travelling efficiency. Furthermore, the travel plan generation unit 14 generates the travel path of the vehicle V so as to avoid the contact with an object based on the situation of the object around the vehicle V. A travelling route automatically generated based on the external situation or the map information when the setting of the destination is not explicitly performed by the driver is also included in the target route.

The travel plan generation unit 14 generates the travel plan in accordance with the generated travel path. That is, the travel plan generation unit 14 generates the travel plan along the target route set on the map in advance based on the external situation which is at least the information surrounding the vehicle V and the map information in the map database 5. For example, a control target value (an example of a target value) which is a target when the autonomous driving system 100 performs the vehicle control is also included in the travel plan. For example, the travel plan may include the target speed of the vehicle V, the target acceleration, or the target steering torque of the steering when the vehicle V travels on the travel path along the target route. For example, the travel plan may include at least one of a speed pattern of the vehicle V, an acceleration pattern, and a steering torque pattern.

The speed pattern is data formed from a target speed set in association with the time for each target control position with respect to the target control position (including a target lateral position) set on the travel path in a predetermined interval (for example, one meter). The acceleration pattern or deceleration pattern is, for example, data formed from the target acceleration or deceleration set in association with the time for each target control position with respect to the target control position set on the travel path in a predetermined interval (for example, one meter). The steering torque pattern is, for example, data formed from the target steering torque set in association with the time for each target control position with respect to the target control position set on the path in a predetermined interval (for example, one meter).

The travel plan generation unit 14 generates the travel plan in a case where, for example, the information indicating the start of the autonomous driving from the autonomous driving ON/OFF switch is acquired. In addition, the travel plan generation unit 14 outputs the generated travel plan to the storage unit to which the travel control unit 15 can refer.

The travel control unit 15 performs the travel control using the travel plan generated by the travel plan generation unit 14. The travel control means to cause the vehicle V to travel in an autonomous driving state. Specifically, the travel control includes at least one of a speed control in the autonomous driving state and the steering control in the autonomous driving state. The travel control unit 15 may execute only one of the speed control and the steering control or may execute in a combined manner. The speed control in the autonomous driving state is a state in which the adjustment of the speed of the vehicle V or the vehicle-to-vehicle distance can be realized only by the control of the autonomous driving system 100 without the acceleration or deceleration operation by the driver. The steering control in the autonomous driving state is a state in which the adjustment of the lateral position of the vehicle V can be realized only by the control of the autonomous driving system 100 without the steering operation by the driver.

The travel control by the travel control unit 15 is not limited to the travel control using the travel plan. For example, The travel control unit 15 may perform an autonomous speed adjustment (speed control) in which the target speed (or an upper limit speed) and the target vehicle-to-vehicle distance (or an allowable vehicle-to-vehicle distance) are set as the target values. These target values may be a certain value set according to the travelling environment or the regulation, may be a value set by the driver, may be a value that varies according to the time or the distance, or may be a value set by the travel plan generation unit 14 (the autonomous driving system 100) according to the travelling situation. The setting information (setting information for the autonomous driving set by the driver or the autonomous driving system 100) used by the travel control unit 15 is stored in the storage unit included in the ECU 10. The autonomous speed adjustment is a driving state in which the speed of the vehicle V autonomously controlled. For example, the autonomous speed adjustment is the driving state in which, in a case where a preceding vehicle is not present in front of the vehicle V, a constant speed control for causing the vehicle V to travel at a constant speed such as a target speed set in advance is performed, and in which, in a case where the preceding vehicle is present in front of the vehicle V, a follow-up control for adjusting the speed of the vehicle V according to the vehicle-to-vehicle distance to the preceding vehicle such that the distance becomes the vehicle-to-vehicle distance set in advance. The autonomous speed adjustment is realized by the operation of the actuator 9 based on the control signal output from the travel control unit 15. Even in a case where the driver does not perform the acceleration or deceleration operation (acceleration operation (for example, operating an acceleration pedal) or a braking operation (for example, operating a brake pedal)), the speed adjustment for the vehicle V can be autonomously performed by the autonomous speed adjustment.

Alternatively, the travel control unit 15 may perform the autonomous steering adjustment (steering control) in which the target lateral position is set as the target value. The target value may be a certain value (for example, a center of the lane) set according to the travelling environment, may be a value set by the driver, may be a value that varies according to the time or the distance, or may be a value set by the travel plan generation unit 14 (the autonomous driving system 100) according to the travelling situation. The setting information (setting information for the autonomous driving set by the driver or the autonomous driving system 100) used by the travel control unit 15 is stored in the storage unit included in the ECU 10. The autonomous steering adjustment is a driving state in which the steering of the vehicle V is autonomously performed such that the lateral position of the vehicle V becomes the target lateral position (or such that the vehicle V does not depart from the travel lane). The autonomous steering adjustment is realized by the operation of the actuator 9 based on the control signal output from the travel control unit 15. Even in a case where the driver does not perform the steering operation, the steering of the vehicle V along the travel lane can be autonomously performed by the autonomous steering adjustment.

The display control unit 16 is connected to the display unit 8b and causes the display unit 8b to perform displaying operation in a predetermined display mode. As a specific example, the display control unit 16 causes the display unit 8b to perform the displaying operation in any of the display mode among the setting status display mode, operation status display mode, and recognition status display mode. "Causing the display unit 8b to perform the displaying operation in any of the display modes" means that it is sufficient that the display control unit 16 can cause the display unit 8b to perform the displaying operation in at least any of the setting status display mode, the operation status display mode, and the recognition status display mode. That is, display control unit 16 may cause the display unit 8b to perform the displaying operation in a display mode other than the setting status display mode, the operation status display mode, and the recognition status display mode. For example, display control unit 16 can cause the display unit 8b to perform the displaying operation in an overhead-view image display mode in which the vehicle is viewed from the top. The display control unit 16 causes the information relating to the autonomous driving of the vehicle V to be displayed on the display unit 8b in a predetermined display mode referring to the storage unit included in the ECU 10.

Hereinafter, the display modes on the display unit 8b based on the control signal from the display control unit 16 will be described.

1. Setting Status Display Mode

The setting status display mode is a display mode in which setting information for the autonomous driving set by the driver or the autonomous driving system 100. The setting information is a parameter necessary to be set by the driver or the autonomous driving system 100 in order for the autonomous driving system 100 to realize the autonomous driving. For example, in a case where the autonomous driving is to control the speed, the setting information includes the target speed, the upper limit speed, the set vehicle-to-vehicle distance, and the like. For example, in a case where the autonomous driving is to control the steering, the setting information includes the target lateral position and the like. The display control unit 16 acquires the setting information referring to the storage unit included in the ECU 10 and displays the setting information on the display unit 8b.

Figure 2:
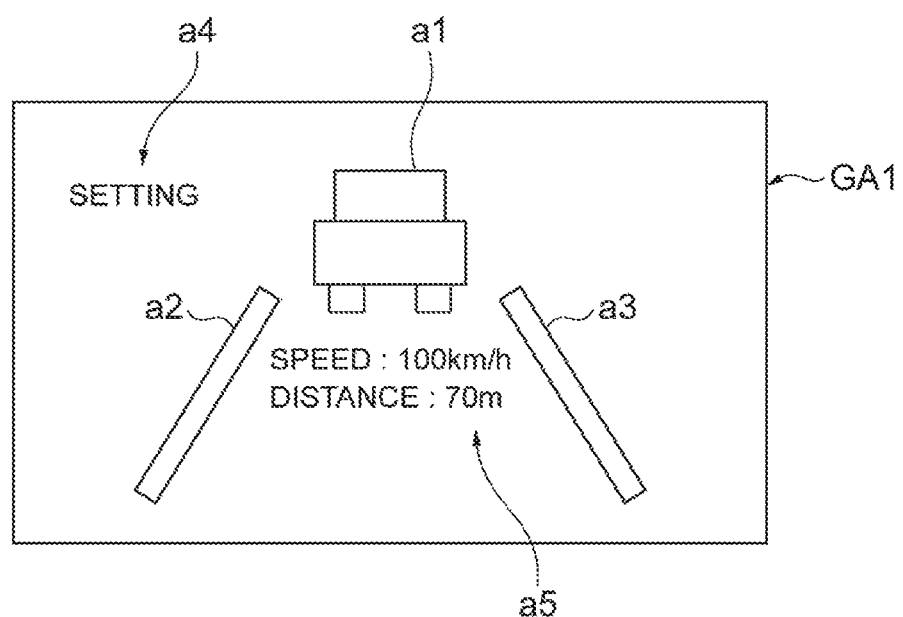
FIG. 2 is an example of a screen displayed on a display unit in a setting status display mode.

FIG. 2 is an example of a screen displayed on the display unit 8b in a setting status display mode. FIG. 2 illustrates a set status display screen GA1 as an example of displaying the setting information of the speed control. The set status display screen GA1 includes a vehicle icon a1, travel lane boundary line icons a2 and a3, a text a4 indicating the setting information, and a set status text a5 (setting information) indicating the set status. Here, the display unit 8b displays "speed: 100 km" indicating the upper limit speed, "distance: 70 m" indicating the set vehicle-to-vehicle distance as the set status text a5. The display of the setting information is not limited to the text format, and may be in a graphic format. The set status display screen GA1 may include at least the icon which is the setting information or the text. The content of the text a4 may be presented by a voice from the voice output unit 8a. The vehicle icon a1, the travel lane boundary line icons a2 and a3 may not be displayed. Alternatively, the vehicle icon a1, the travel lane boundary line icons a2 and a3 may not be displayed depending on the device type of the display unit 8b. For example, in a case where a navigation screen display device connected to the navigation system 7 or a display provided on an instrument panel is adopted as the display unit 8b, the set status display screen GA1 including the vehicle icon a1, the travel lane boundary line icons a2 and a3 may be displayed. For example, in a case where an HUD is adopted as the display unit 8b, the vehicle icon a1, the travel lane boundary line icons a2 and a3 may be omitted, and a virtual image of the text a4 and the set status text a5 may be projected on the windshield.

2. Operation Status Display Mode

The operation status display mode is a display mode in which the travel information is displayed when the autonomous driving system 100 is in operation. The travel information when the autonomous driving system 100 is in operation is information relating to the travelling state which is the result of control by the autonomous driving system 100. The travel information is, for example, a sensor value (detection value) of the target of control corresponding to the setting information. For example, in a case where the autonomous driving is to control the speed, the travel information is a detection value such as a speed, a vehicle-to-vehicle distance, or the like. For example, in a case where the autonomous driving is to control the steering, the travel information is a result of recognizing the lateral position, or the like. The display control unit 16 acquires the travel information referring to the storage unit included in the ECU 10 and displays the travel information on the display unit 8b.

Figure 3:
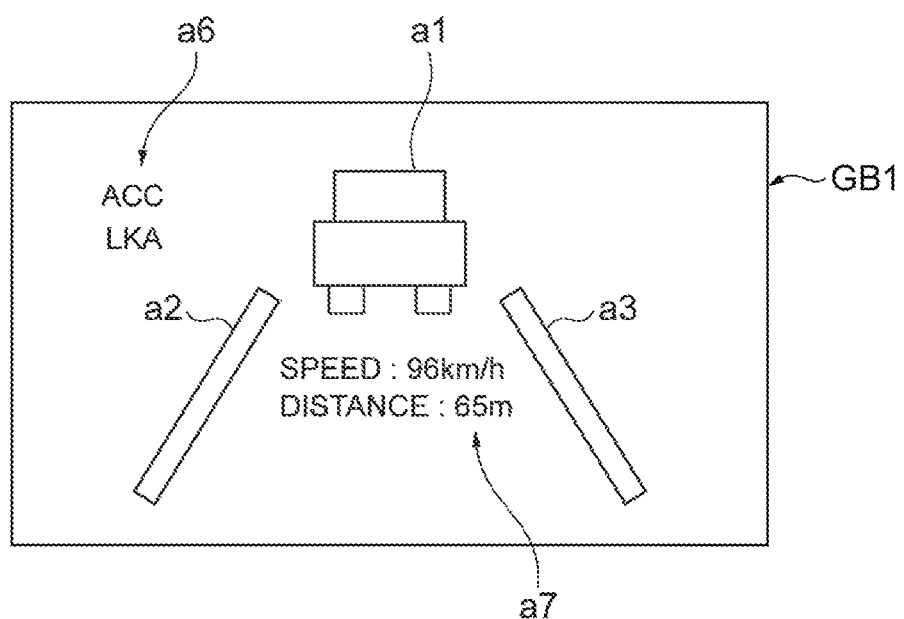
FIG. 3 is an example of a screen displayed on the display unit in an operation status display mode.

FIG. 3 is an example of a screen displayed on the display unit 8b in the operation status display mode. FIG. 3 illustrates a travel status display screen GB1 as an example of displaying the travel information of the speed control. The travel status display screen GB1 includes a vehicle icon a1, travel lane boundary line icons a2 and a3, a text a6 indicating a type of the autonomous driving in operation, and travel status text a7 (travel information) indicating the travel status. Here, the display unit 8b displays an "adaptive cruise control" (ACC) indicating that the speed control (preceding vehicle follow-up control) is in operation and a "lane keeping assist" (LKA) indicating that the steering control (lane keeping control) is in operation as the text a6. Then, the display unit 8b displays a sensor value "speed: 96 km" indicating the current speed, a sensor value "distance: 65 m" indicating the current vehicle-to-vehicle distance as the travel status text a7. The display of the lateral position is omitted. The display of the travel information is not limited to the text format, and may be in a graphic format. The travel status display screen GB1 may include at least the icon or the text which is the travel information. The content of the text a6 may be presented by a voice from the voice output unit 8a. The vehicle icon a1, the travel lane boundary line icons a2 and a3 may not be displayed. Alternatively, the vehicle icon a1, the travel lane boundary line icons a2 and a3 may not be displayed depending on the device type of the display unit 8b. For example, in a case where a navigation screen display device connected to the navigation system 7 or a display provided on an instrument panel is adopted as the display unit 8b, the travel status display screen GB1 including the vehicle icon a1, the travel lane boundary line icons a2 and a3 may be displayed. For example, in a case where an HUD is adopted as the display unit 8b, the vehicle icon a1, the travel lane boundary line icons a2 and a3 may be omitted, and a virtual image of the text a6 and the travel status text a7 may be projected on the windshield.

3. Recognition Status Display Mode

The recognition status display mode is a display mode in which the recognition result information of the autonomous driving system 100 is displayed. The recognition result information of the autonomous driving system 100 is, for example, a result of recognizing the vehicle position, the travel lane, or the external situation. The result of recognizing the external situation includes a result of recognizing another vehicle in front of the vehicle V or a result of recognizing the lane. The display control unit 16 acquires the recognition result information referring to the storage unit included in the ECU 10 and displays the recognition result information on the display unit 8b.

In the recognition status display mode, the recognition result information of the autonomous driving system 100 may be displayed in association with a actual scene, an image or a video image in which the actual scene is imaged, or the map information. In a case of this configuration, since the correspondence relationship between the actual scene or the map and the recognition result is presented to the driver, it is possible for the driver to grasp the degree of the recognition of the autonomous driving system. A known method can be used for displaying with such a correspondence relationship. For example, in a case where a navigation screen display device connected to the navigation system 7 or a display provided on an instrument panel is adopted as the display unit 8b, the display control unit 16 may display a layer of the image or the video image imaged by the camera (an example of the external sensor 2) and a layer of the image in which the icon or text which are the recognition result information are displayed, on the display unit 8b in a superimposed manner. Alternatively, the display control unit 16 may display a layer of the image (for example, the image of in front of the travel lane) drawn based on the map information and a layer of the image in which the icon or text which are the recognition result information are displayed, on the display unit 8b in a superimposed manner. In addition, the display control unit 16 may generate and display an image in which the icon or the text is embedded in the image or the video image imaged by the camera (an example of the external sensor 2) without dividing the images into the layers. In a case where an HUD is adopted as the display unit 8b, the image or the video image imaged by the camera (an example of the external sensor 2) is not needed. In a case where an HUD is adopted as the display unit 8*b*, the display control unit 16 may cause the virtual image of the recognition result information to be projected on the windshield in such a manner that the actual scene that is present ahead of the driver's line of sight and the recognition result information are superimposed on the driver's line of sight. In this way, the actual scene and the recognition result information are displayed in a superimposed manner.

In a case where the display unit 8*b* displays the information in the recognition status display mode, the display control unit 16 may display the travel lane of the vehicle V recognized by the autonomous driving system 100 and the certainty level of recognizing the travel lane on the display unit 8*b*.

Figure 4A:
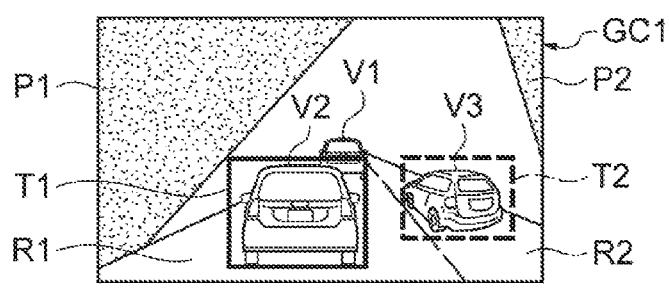
FIGS. 4A to 4E are examples of screens displayed on the display unit in a recognition status display mode.

FIGS. 4A to 4E are examples of screens displayed on the display unit 8*b* in the recognition status display mode. In FIG. 4A, a recognition status display screen GC1 is illustrated as an example, in which objects indicating the result of recognizing other vehicles travelling in front of the vehicle V are displayed in a superimposed manner on the image in which front of the vehicle V is imaged by the camera (an example of the external sensor 2). Here, the vehicle V is travelling on a two-lane road and other vehicles V1 to V3 are travelling in front of the vehicle V. In addition, the vehicle V is travelling in the left side travel lane on the two-lane road. Hereinafter, the description will be made with the left lane as a first lane R1 and the right lane as a second lane R2. The external situation recognition unit 11 recognizes the other vehicles V2 and V3, and stores the recognition result and the certainty level of the recognition in association with each other in the storage unit included in the ECU 10. In addition, the travelling state recognition unit 13 stores, for example, the recognition result indicating that the travel lane of the vehicle V is the first lane R1 and the certainty level of the recognition in association with each other in the storage unit included in the ECU 10.

The display control unit 16 causes the recognition status display screen GC1 to be displayed on the display unit 8*b* based on, for example, the camera video image and the information obtained referring to the storage unit included in the ECU 10. For example, the display control unit 16 configures the recognition status display screen GC1 by creating the camera video image, rectangular objects T1 and T2 indicating the result of recognizing other vehicles, and objects P1 and P2 indicating the result of recognizing the travel lane in the layers different from each other, and then, superimposing the plurality of layers.

Figure 4B:
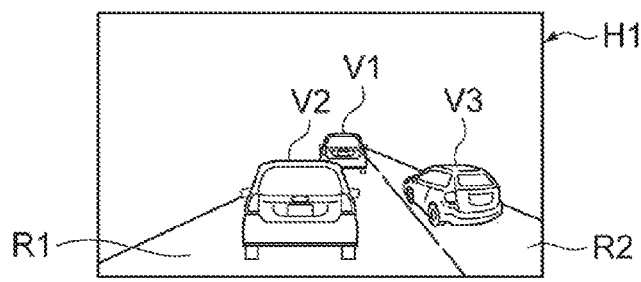
Figure 4C:
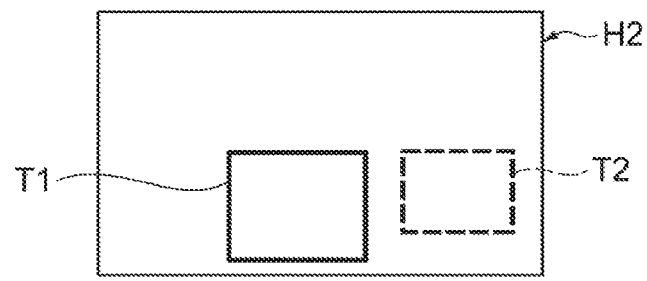

FIG. 4B illustrates an example of a camera video image H1. FIG. 4C illustrates an image H2 including rectangular object images T1 and T2 indicating the result of recognizing other vehicles. The display control unit 16 may change the object of the result of recognizing the other vehicles according to the certainty level of the recognition. For example, the display control unit 16 generates the object according to the certainty level of the recognition or may store the objects in the storage unit included in the ECU 10 in association with the certainty level of the recognition and may read out the object from the storage according to the certainty level of the recognition. Here, the display control unit 16 adopts a rectangular object of a dashed line in a case where the certainty level of the recognition is lower than a predetermined value, and in a case where the certainty level of the recognition is equal to or higher than the predetermined value, adopts a rectangular object of a solid line. In the example in FIG. 4C, since the certainty level of recognizing the other vehicle V2 is equal to or higher than the predetermined value, the rectangular object T2 of a solid line is adopted as the recognition result information of the other vehicle V2. On the other hand, since the certainty level of the recognizing the other vehicle V3 is lower than the predetermined value, the rectangular object T3 of a dashed line is adopted as the recognition result information of the other vehicle V3. The display control unit 16 may change colors of the objects according to the certainty level or may display the certainty levels in numerical values.

Figure 4D:
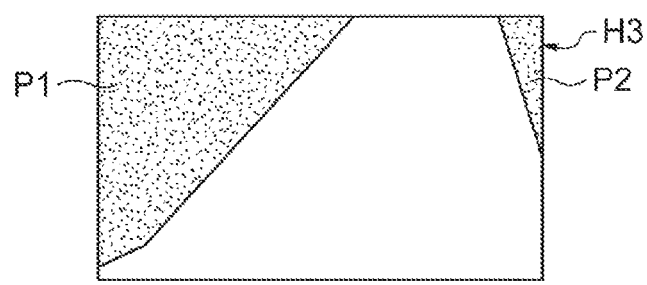
Figure 4E:
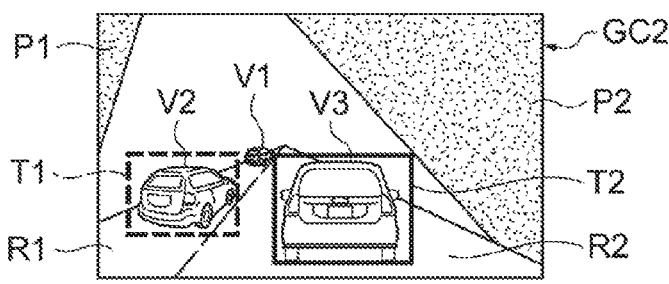

FIG. 4D illustrates an image H3 including objects P1 and P2 indicating the result of recognizing the travel lane. The objects P1 and P2 indicate which lane is the travel lane according to areas of the displayed lanes. In a case where the area of the object P1 on the left side is larger than the area of the object P2 on the right side, the travel lane is indicated as the first lane R1. In a case where the area of the object P2 on the right side is larger than the area of the object P1 on the left side, the travel lane is indicated as the second lane R2 (for example, FIG. 4E). The display control unit 16 may change the object of the result of recognizing the other vehicle according to the certainty level of the recognition. Here, display control unit 16 changes a color density or the degree of transparency of the object according to the certainty level of the recognition. For example, display control unit 16 may increase the color density of the object or may decrease the degree of the transparency as the certainty level of the recognition increases. The display control unit 16 may change the colors of the objects according to the certainty level or may display the certainty levels in numerical values.

The display control unit 16 configures the recognition status display screen GC1 illustrated in FIG. 4A by displaying the camera video image H1 and the images H1, H2, and H3 respectively illustrated in FIGS. 4B to 4D in a superimposed manner. In this way, it is possible to display the recognition result of the autonomous driving system 100 in correspondence with the actual scene. Accordingly, it is possible to present the facts that the autonomous driving system 100 recognizes the other vehicles V2 and V3 without recognizing the other vehicle V1, that the certainty level of recognizing the other vehicle V3 is low, and that the travel lane is recognized as the first lane R1, to the driver in correspondence with the actual scene.

Figure 5A:
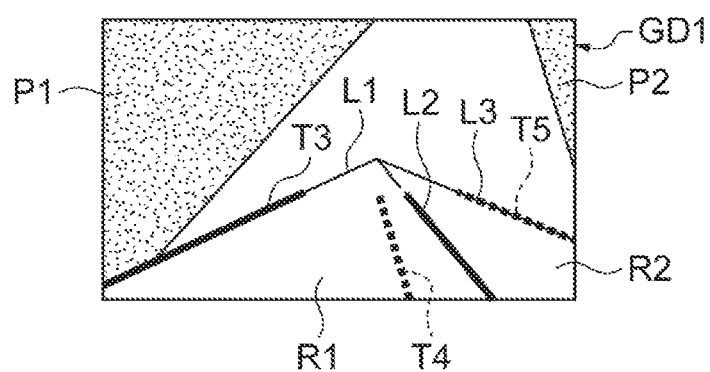
FIGS. 5A to 5D are examples of screens displayed on the display unit in the recognition status display mode.

FIGS. 5A to 5D are examples of screens displayed on the display unit 8*b* in the recognition status display mode. FIG. 5A illustrates an example of recognition status display screen GD1 in which an object indicating a result of recognizing the lane of the vehicle V is displayed on the video image in which the front of the vehicle V is imaged by the camera (an example of the external sensor 2) in a superimposed manner. FIG. 5A illustrates a scene same as the scene in FIG. 4A and the other vehicles V1 to V3 are omitted in order for the convenience in describing and understanding. Here, the vehicle V travels on the two-lane road. In addition, the vehicle V travels in the first lane R1 on the two-lane road. The external situation recognition unit 11 recognizes, for example, boundary lines L1 and L2 of the first lane R1, boundary lines L2 and L3 of the second lane R2, and stores the recognition result in the storage unit included in the ECU 10 in association with the certainty level of the recognition. In addition, the travelling state recognition unit 13 stores, for example, the recognition result that the travel lane of the vehicle V is the first lane R1 in the storage unit included in the ECU 10 in association with the certainty level of the recognition.

The display control unit 16 causes the recognition status display screen GD1 to be displayed on the display unit 8*b* based on, for example, the camera video image and the information obtained referring to the storage unit included in the ECU 10. For example, the display control unit 16 configures the recognition status display screen GD1 by creating the camera video image, objects T3 to T5 indicating the result of recognizing the boundary lines of the lane, and the objects P1 and P2 indicating the result of recognizing the travel lane in the layers different from each other, and then, superimposing the plurality of layers.

Figure 5B:
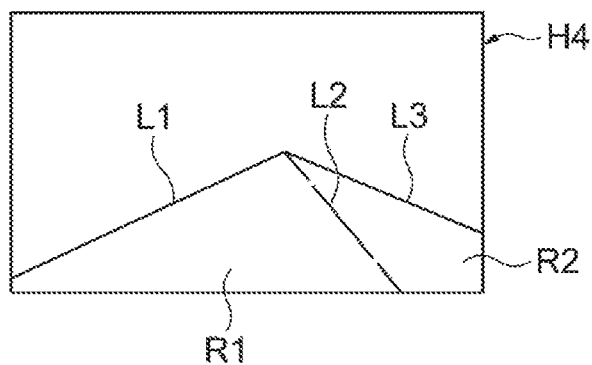
Figure 5C:
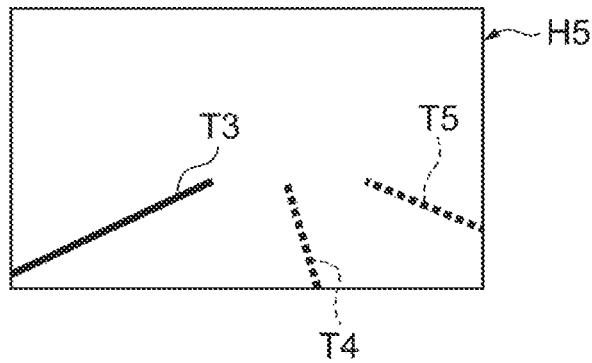

FIG. 5B illustrates an example of a camera video image H4. FIG. 5C illustrates an image H5 including the objects T3 to T5 indicating the result of recognizing the boundary lines of the lane. The display control unit 16 may change the object of the result of recognizing the other vehicles according to the certainty level of the recognition. For example, the display control unit 16 may generate the object according to the certainty level of the recognition or may store the objects in the storage unit included in the ECU 10 in association with the certainty level of the recognition and may read out the object from the storage unit according to the certainty level of the recognition. Here, in a case where the certainty level of the recognition is lower than a predetermined value, the display control unit 16 adopts a rectangular object of a dashed line, and in a case where the certainty level of the recognition is equal to or higher than the predetermined value, adopts a rectangular object of a solid line. In the example in FIG. 5C, since the certainty level of the recognizing the boundary line L1 is equal to or higher than the predetermined value, the object T3 of a solid line is adopted as the recognition result information of the boundary line L1. On the other hand, since the certainty level of recognizing the boundary lines L2 and L3 is lower than the predetermined value, the objects T4 and T5 of dashed lines are adopted as the recognition result information of the boundary lines L2 and L3. The display control unit 16 may change the colors of the objects according to the certainty level or may display the certainty levels in numerical values.

Figure 5D:
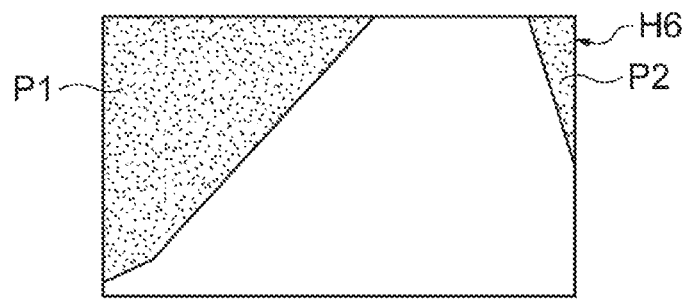

FIG. 5D illustrates an image H6 including objects P1 and P2 indicating the result of recognizing the travel lane. The image H6 is created in a same method as the method of creating the image H3 illustrated in FIG. 4D.

The display control unit 16 configures the recognition status display screen GD1 illustrated in FIG. 5A by displaying the camera video image H4, the images H5 and H6 illustrated in FIGS. 5B to 5D in a superimposed manner. In this way, it is possible to display the recognition result of the autonomous driving system 100 in correspondence with the actual scene. Accordingly, it is possible to present the facts that the autonomous driving system 100 recognizes the boundary lines L1 to L3 of the lane, that the certainty level of recognizing the boundary lines L2 and L3 is low and the position of the boundary line L2 is recognized as being shifted, and that the travel lane is recognized as the first lane R1, to the driver.

Figure 6A:
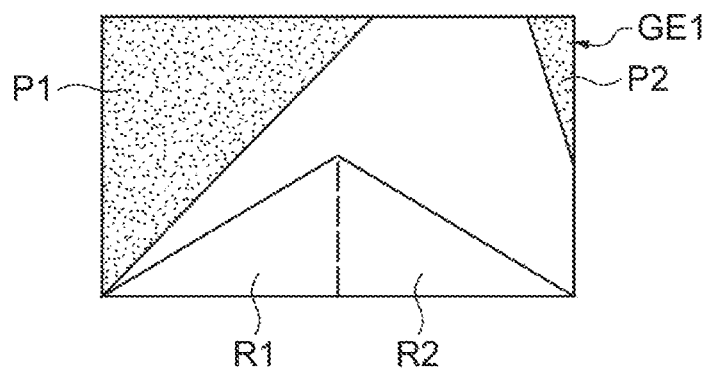
FIGS. 6A to 6C are examples of screens displayed on the display unit in the recognition status display mode.
Figure 6B:
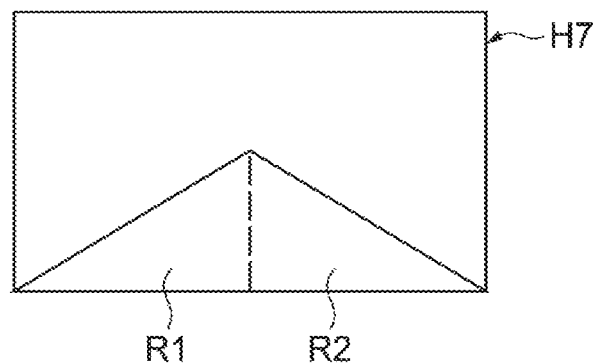
Figure 6C:
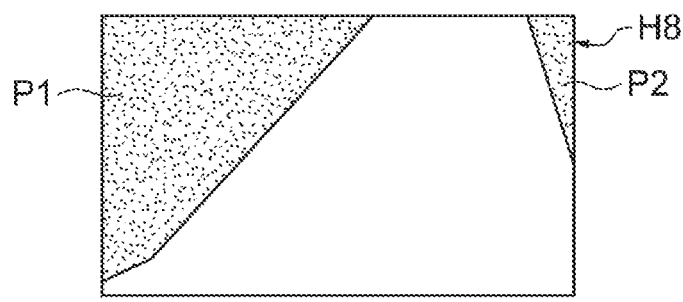

FIGS. 6A to 6C are examples of screens displayed on the display unit 8b in the recognition status display mode. FIG. 6A illustrates an example of recognition status display screen GE1 in which an object indicating a result of recognizing the travel lane of the vehicle V is displayed on the road image in the map information in a superimposed manner. FIG. 6A illustrates a scene same as the scene in FIG. 4A. Here, the vehicle V travels on the two-lane road. In addition, the vehicle V travels in the first lane R1 on the two-lane road. The travelling state recognition unit 13 stores, for example, the recognition result which indicates that the travel lane of the vehicle V is the first lane R1 in the storage unit included in the ECU 10 in association with the certainty level of the recognition.

The display control unit 16 causes the recognition status display screen GE1 to be displayed on the display unit 8b based on, for example, the map information obtained from the map database 5 and the information obtained referring to the storage unit included in the ECU 10. For example, the display control unit 16 configures the recognition status display screen GE1 by creating the road image and the objects P1 and P2 indicating the result of recognizing the travel lane in the layers different from each other, and then, superimposing the plurality of layers.

FIG. 6B illustrates an example of a road image H7. FIG. 6C illustrates an image H8 including the objects P1 and P2 indicating the result of recognizing the travel lane. The image H8 is created in a same method as the method of creating the image H3 illustrated in FIG. 4D.

The display control unit 16 configures the recognition status display screen GE1 illustrated in FIG. 6A by displaying the road image H7 and the image H8 illustrated in FIGS. 6B and 6C in a superimposed manner. In this way, it is possible to display the recognition result of the autonomous driving system 100 in correspondence with the map. Accordingly, it is possible to present the fact that the travel lane is recognized as the first lane R1 to the driver.

Here, the description regarding the display modes is finished.

The acquisition unit 17 illustrated in FIG. 1 acquires a driver's display mode switching instruction to switch the display mode of the display unit 8b. The acquisition unit 17 acquires the driver's display mode switching instruction based on, for example, the output signal from the display mode switch 6.

In a case where the driver's display mode switching instruction is acquired by the acquisition unit 17, the display control unit 16 switches the display mode of the display unit 8b based on the driver's display mode switching instruction. The display mode switching instruction may be an instruction to designate a display mode after the switching or may be an instruction to simply switch the display mode in a case where the display mode after the switching can be specified by a predetermined order. For example, in a case where the display mode is set to be switched in an order of the setting status display mode, the operation status display mode and the recognition status display mode, when the driver's display mode switching instruction is acquired by the acquisition unit 17, the display control unit 16 switches the display mode of the display unit 8b based on the driver's display mode switching instruction. In addition, even in a case where the display unit 8b is caused to operate in a predetermined display mode, the display control unit 16 may calculate information necessary for displaying in another display mode in the background. As described above, by generating each of the display screens in each of the display modes in parallel in advance, it is possible to perform the quick switching of the display mode.

The information presentation system 1 is configured to include, for example, the display control unit 16, the acquisition unit 17, and the display unit 8b described above.

Figure 7:
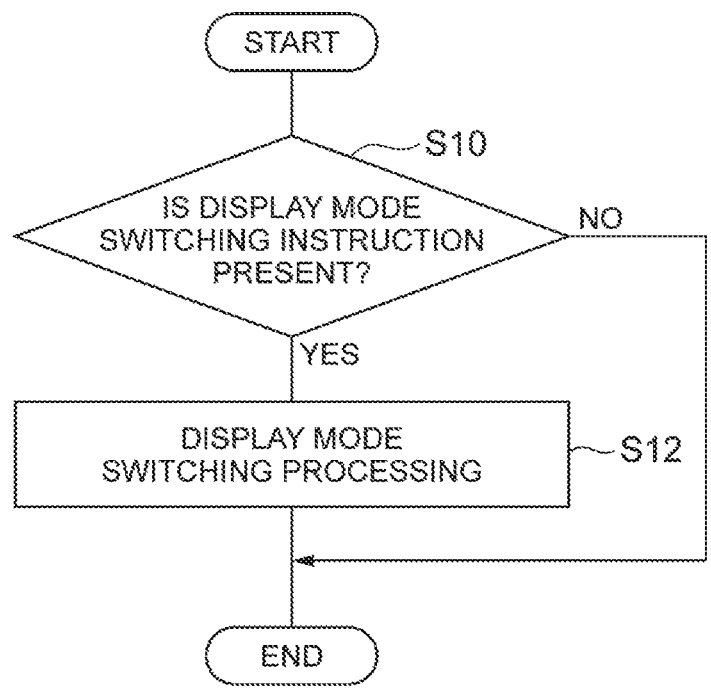
FIG. 7 is a flowchart of display mode switching processing in the information presentation system.

Next, the display mode switching processing in the information presentation system will be described. FIG. 7 is a flowchart of the display mode switching processing in the information presentation system. The flowchart illustrated in FIG. 7 starts by the ECU 10 in a case where, for example, the autonomous driving (at least any of the speed control and the steering control) is executed on the vehicle V and the display unit 8b displays the screen in a predetermined display mode.

As illustrated in FIG. 7, the acquisition unit 17 in the information presentation system 1 determines the presence or absence of the driver's display mode switching instruction as determination processing (S10). For example, in a case where a signal is acquired from the display mode switch, the acquisition unit 17 determines that the driver's display mode switching instruction is present. In this case, the process proceeds to the switching processing (S12).

The display control unit 16 changes the display mode as the switching processing (S12). That is, the display control unit 16 changes the display mode of the display unit 8b. When the switching processing ends, the display mode switching processing illustrated in FIG. 7 ends. In addition, in the determination processing (S10), in a case where a signal is not acquired from the display mode switch, the acquisition unit 17 determines that the driver's display mode switching instruction is not present, and the display mode switching processing illustrated in FIG. 7 ends.

In a case where the display mode switching processing illustrated in FIG. 7 ends, the processing is executed from S10 again in the order. That is, the display mode switching processing illustrated in FIG. 7 is repeatedly executed. For example, the autonomous driving of the vehicle V is finished, even in a case where the display mode switching processing ends, the display mode switching processing is not repeatedly executed.

Here, the display mode switching processing illustrated in FIG. 7 ends. FIG. 8 is a conceptual diagram describing the display mode switching processing. As illustrated in FIG. 8, by executing the display mode switching processing illustrated in FIG. 7, the display mode is sequentially switched in each time the driver's display mode switching instructions OP1 to OP5 are acquired. That is, a screen displayed in a predetermined display mode is switched to a screen displayed in another display mode based on the display mode switching instructions OP1 to OP5. As described above, by making the screen transition, it is possible to present the information relating to the autonomous driving system 100 to the driver while comparing the screens of each display mode. Therefore, it is possible to provide the information relating to the autonomous driving system 100 in an easily understandable aspect to the driver.

As described above, in the information presentation system 1 according to the present embodiment, the display control unit 16 causes the display unit 8b to perform the displaying in any one of the display modes among the setting status display mode, the operation status display mode, and the recognition status display mode. In a case where the occupant's display mode switching instruction is acquired by the acquisition unit 17, the display control unit 16 causes the display mode of the display unit 8b to be switched based on the driver's display mode switching instruction. Therefore, this information presentation system 1 can present the recognition information of the autonomous driving system 100 to the occupant in association with the setting information in the autonomous driving system 100 and the travel information based on the occupant's instruction.

In addition, in the information presentation system 1 according to the present embodiment, in a case where the display unit 8b is caused to perform the displaying in a recognition status display mode, the display control unit 16 may cause the travel lane of the vehicle V recognized by the autonomous driving system 100 and the certainty level of recognizing the travel lane on the display unit 8b. In this case, this information presentation system 1 can present the travel lane of the vehicle V recognized by the autonomous driving system 100 and the certainty level of recognizing the travel lane to the occupant in association with the setting information in the autonomous driving system 100 and the travel information of the vehicle based on the occupant's instruction.

The embodiment of the present invention is described as above. However, the present invention is not limited to the embodiment described above. The present invention can be executed in various forms in which various changes and modifications are made with respect to the above-described embodiment based on knowledge of those skilled in the art.

What is claimed is:

1. A vehicle comprising:
   an external sensor configured to detect surrounding information of the vehicle;
   a display unit configured to display a recognition result associated with the surrounding information, of the vehicle, detected by the external sensor; and
   a display control unit configured to cause the display unit to display the recognition result associated with the surrounding information, of the vehicle, detected by the external sensor,
   wherein the recognition result is based on a certainty level of the recognition result, and
   wherein the display control unit is configured to switch among a set of screens, including:
   (A) a first screen which displays objects, indicating the recognition result of other vehicles travelling in front of the vehicle, in a superimposed manner on an image, corresponding to a front of the vehicle, that is imaged by the external sensor;
   (B) a second screen which displays the image, corresponding to the front of the vehicle, that is imaged by the external sensor; and
   (C) a third screen which displays another image, including an object indicating another recognition result corresponding to a travel lane of the vehicle, that is imaged by the external sensor.

2. The vehicle according to claim 1, wherein the display control unit is configured to cause the display unit to display the recognition result as first information when the certainty level is lower than a predetermined value, and
   wherein the display control unit is configured to cause the display unit to display the recognition result as second information, that is different than the first information, when the certainty level is equal to, or higher than, the predetermined value.

3. The vehicle according to claim 1, wherein the display control unit is configured to cause the display unit to display the recognition result as a first object when the certainty level is lower than a predetermined value, and
   wherein the display control unit is configured to cause the display unit to display the recognition result as a second object, that is different than the first object, when the certainty level is equal to, or higher than, the predetermined value.

4. The vehicle according to claim 1, wherein the display control unit is configured to switch between a recognition status display mode, in which the recognition result is displayed, and another display mode.

5. The vehicle according to claim 4, further comprising:
   an internal sensor configured to detect a travelling state, of the vehicle, that includes at least one of a speed, an acceleration, or a yaw rate, of the vehicle; and
   a travel control unit configured to control a travel plan in an autonomous driving state, wherein at least one of the speed of the vehicle or a steering of the vehicle is controlled in the autonomous driving state, wherein the display control unit is configured to switch between the recognition status display mode and a setting status display mode in which setting information, for the travel plan set by an occupant of the vehicle or the travel control unit, is displayed, wherein information identifying a set vehicle speed and a set vehicle-to-vehicle distance is displayed between information associated with a set of objects corresponding to boundary lines of a driving lane, and wherein another object, indicating that the setting information is being displayed, is displayed outside of the information associated with the set of objects corresponding to the boundary lines of the driving lane.

6. The vehicle according to claim 1, wherein the recognition result corresponds to a travel lane associated with the vehicle; and wherein the vehicle further comprises:
a vehicle position recognition unit configured to calculate the certainty level based on a position of the vehicle and map information.

7. The vehicle according to claim 1, wherein the display unit is a head up display (HUD) projected on a windshield of the vehicle; and the display control unit is configured to cause a virtual image, including the recognition result, to be projected on the HUD.

8. The vehicle according to claim 1, wherein the display control unit is configured to acquire travel information including at least one of a speed of the vehicle, a distance to another vehicle, or a lateral position of the vehicle; and
wherein the display control unit is configured to cause the display unit to display the travel information.

9. The vehicle according to claim 1, wherein the display control unit is configured to cause the display unit to change the display of the recognition result based on the certainty level associated with a position of the vehicle.

10. The vehicle according to claim 1, wherein the display control unit is configured to cause the display unit to change the display of the recognition result based on the certainty level associated with a travel lane of the vehicle.

11. The vehicle according to claim 1, wherein the display control unit is configured to cause the display unit to change the display of the recognition result based on the certainty level of an external situation of the vehicle.

12. The vehicle according to claim 1, wherein the display unit is a navigation screen display; and
wherein the display control unit, when causing the display unit to display the recognition result associated with the surrounding information of the vehicle detected by the external sensor, is configured to:
cause the navigation screen display to display the recognition result associated with the surrounding information of the vehicle detected by the external sensor in association with map information.

13. The vehicle according to claim 1, wherein the display control unit, when changing the display of the recognition result based on the certainty level, is configured to change a degree of transparency of an object that corresponds to the recognition result.

14. The vehicle according to claim 1, wherein the display control unit, when changing the display of the recognition result based on the certainty level, is configured to change a color of an object that corresponds to the recognition result.

15. The vehicle according to claim 1, wherein the display control unit, when changing the display of the recognition result based on the certainty level, is configured to change a numerical value that corresponds to the certainty level of the recognition result.

16. A method, comprising:
detecting, by an external sensor of a vehicle, surrounding information of the vehicle;
displaying, by a display unit of the vehicle, a recognition result associated with the surrounding information, of the vehicle, detected by the external sensor; and
causing, by a display control unit of the vehicle, the display unit to display the recognition result associated with the surrounding information, of the vehicle, detected by the external sensor,
wherein the display control unit changes a display of the recognition result based on a certainty level of the recognition result, and
wherein the display control unit is configured to switch among a set of screens, including:
(A) a first screen which displays objects, indicating the recognition result of other vehicles travelling in front of the vehicle, in a superimposed manner on an image, corresponding to a front of the vehicle, that is imaged by the external sensor;
(B) a second screen which displays the image, corresponding to the front of the vehicle, that is imaged by the external sensor; and
(C) a third screen which displays another image, including an object indicating another recognition result corresponding to a travel lane of the vehicle, that is imaged by the external sensor.

* * * * *